US006191194B1

(12) United States Patent
Anand et al.

(10) Patent No.: US 6,191,194 B1
(45) Date of Patent: *Feb. 20, 2001

(54) SILICON-TREATED CARBON BLACKS SURFACE TREATED WITH A SILICONE FLUID OR A SILANE

(75) Inventors: Joginder N. Anand, Naperville; John E. Mills, Arcola, both of IL (US); Steven R. Reznek, Concord, MA (US)

(73) Assignee: Cabot Corporation, Boston, MA (US)

( * ) Notice: Under 35 U.S.C. 154(b), the term of this patent shall be extended for 0 days.

This patent is subject to a terminal disclaimer.

(21) Appl. No.: 09/438,897

(22) Filed: Nov. 12, 1999

Related U.S. Application Data

(63) Continuation of application No. 08/529,234, filed on Sep. 15, 1995, now Pat. No. 6,020,402.

(51) Int. Cl.$^7$ .............................. C08K 9/06; C09C 1/56; C09C 1/44
(52) U.S. Cl. ........................ 523/212; 523/215; 524/496
(58) Field of Search .................... 523/212, 215; 524/496; 423/346, 460

(56) References Cited

U.S. PATENT DOCUMENTS

| | | | |
|---|---|---|---|
| 1,999,573 | 4/1935 | Odell | 134/60 |
| 2,375,795 | 5/1945 | Krejci | 23/209.8 |
| 2,564,700 | 8/1951 | Krejci | 23/209.4 |
| 2,632,713 | 3/1953 | Krejci | 106/307 |
| 3,094,428 | 6/1963 | Hamilton et al. | 106/307 |
| 3,188,225 | 6/1965 | Walker | 106/291 |
| 3,203,819 | 8/1965 | Steenken et al. | 106/307 |
| 3,290,165 | 12/1966 | Iannicelli | 106/308 |
| 3,390,006 | 6/1968 | Takewell et al. | 106/475 |
| 3,622,650 | 11/1971 | Berstein et al. | 260/763 |
| 3,660,132 | 5/1972 | Illigen et al. | 106/307 |
| 3,663,285 | 5/1972 | Graf et al. | 106/308 |
| 3,689,452 | 9/1972 | Burke, Jr. | 260/33.6 |
| 3,716,513 | 2/1973 | Burke, Jr. | 260/33.6 |
| 3,997,356 | 12/1976 | Thurn et al. | 106/288 |
| 4,108,679 | 8/1978 | Szczepanik et al. | 106/307 |
| 4,211,578 | 7/1980 | Scott, IV | 106/475 |
| 4,221,693 | 9/1980 | Getson et al. | 260/37 |
| 4,297,145 | 10/1981 | Wolff et al. | 106/308 |
| 4,590,052 | 5/1986 | Chevallier et al. | 423/335 |
| 4,670,059 | 6/1987 | Hackleman et al. | 106/475 |
| 4,751,204 | 6/1988 | Kyoden et al. | 501/89 |
| 4,785,047 | 11/1988 | Jensen | 524/714 |
| 4,929,391 | 5/1990 | Kroupa | 252/511 |
| 5,149,732 | 9/1992 | Igarashi et al. | 524/426 |
| 5,227,425 | 7/1993 | Rauline | 524/493 |
| 5,286,291 | 2/1994 | Bernhardt et al. | 106/475 |
| 5,294,253 | 3/1994 | Carlson et al. | 106/475 |
| 5,328,949 | 7/1994 | Sandstrom et al. | 524/262 |
| 5,336,730 | 8/1994 | Sandstrom et al. | 524/492 |
| 5,401,789 | 3/1995 | Wolff et al. | 523/213 |
| 5,430,087 | 7/1995 | Carlson et al. | 106/475 |
| 5,502,146 | 3/1996 | Inoue et al. | 528/34 |
| 5,580,919 | 12/1996 | Agostini et al. | 524/430 |
| 5,622,557 | 4/1997 | Mahmud et al. | 106/712 |
| 5,679,728 | 10/1997 | Kawazura et al. | 523/216 |
| 5,830,930 | 11/1998 | Mahmud et al. | 523/215 |
| 5,863,323 | 1/1999 | Mahmud et al. | 106/712 |
| 5,869,550 | 2/1999 | Mahmud et al. | 523/215 |
| 5,877,238 | 3/1999 | Mahmud et al. | 523/215 |
| 5,900,029 | 5/1999 | Belmont et al. | 8/550 |
| 5,904,762 | 5/1999 | Mahmud et al. | 106/475 |
| 5,916,934 | 6/1999 | Mahmud et al. | 523/215 |
| 5,919,841 | 7/1999 | Mahmud et al. | 523/351 |
| 5,948,835 | 9/1999 | Mahmud et al. | 523/215 |
| 5,977,213 | 11/1999 | Mahmud et al. | 523/351 |
| 6,020,402 | * 2/2000 | Anand et al. | 523/212 |

FOREIGN PATENT DOCUMENTS

| | | |
|---|---|---|
| 35 02 494 A1 | 8/1985 | (DE) . |
| 38 13 678 A1 | 11/1988 | (DE) . |
| 195 20 946 A1 | 12/1996 | (DE) . |
| 0 468 140 A2 | 1/1992 | (EP) . |
| 0 675 175 A2 | 10/1995 | (EP) . |
| 0 711 805 A1 | 5/1996 | (EP) . |
| 0 799 854 A1 | 10/1997 | (EP) . |
| 0 799 867 A1 | 10/1997 | (EP) . |
| 1230893 | 9/1960 | (FR) . |
| 1 459 019 | 8/1965 | (FR) . |
| 1 499 348 | 9/1966 | (FR) . |
| 1139620 | 1/1969 | (GB) ................... 106/475 |
| 1213186 | 11/1970 | (GB) . |
| 1363428 | 8/1974 | (GB) . |
| 1363429 | 8/1974 | (GB) . |
| 2044741 | 10/1980 | (GB) . |
| 2 296 915 | 7/1996 | (GB) . |
| 5-178604 | 7/1993 | (JP) . |
| 8 073 657 | 3/1996 | (JP) . |
| WO 96/18696 | 6/1996 | (WO) . |
| WO 96/37546 | 11/1996 | (WO) . |
| ISR 96/14583 | 2/1997 | (WO) . |
| WO 97/10291 | 3/1997 | (WO) . |
| ISR 97/08854 | 11/1997 | (WO) . |
| ISR 97/17134 | 1/1998 | (WO) . |

OTHER PUBLICATIONS

Derwent Abstract, AN No. 88–116672 "Surface Treatment of Carbon Black for Powder Coating . . . ," Mar. 22, 1988, JPA 63063755.

(List continued on next page.)

*Primary Examiner*—James J. Seidleck
*Assistant Examiner*—Olga Asinovsky

(57) ABSTRACT

Silicone rubber compositions are disclosed including a silicone polymer and a silicon-treated carbon black. The silicon-treated carbon blacks include a silicon-containing compound that is distributed through at least a portion of the carbon black aggregate. The silicon-treated carbon black is incorporated within a silicone rubber composition as an alternative reinforcing and extending filler, imparting higher hardness to elastomers formed from the composition, when compared to silicone rubber compositions incorporating an untreated carbon black.

10 Claims, No Drawings

OTHER PUBLICATIONS

Concise Encyclopedia of Polymer Science and Engineering, Wiley, 1990, pp. 104–105.

Carbon (Carbon Black) reprinted from Kirk–Othmer: Encyclopedia of Chemical Technology, vol. 4, Third Edition, pp. 631–643, 1978.

M.P. Wagner, "Reinforcing Silicas and Silicates", "Rubber Chemistry & Technology", vol. 49, p. 703, 1976.

Berrod et al. "Reinforcement of Siloxane Elastomers by Silica", Interactions Between an Oligomer of Poly(dimethylsiloxane) and a fumed Silica, "J. App Poly Sci", vol. 23, pp. 2579. (1979).

Gerard Kraus, Reinforcement of Polymers, Ch. 14, "Properties of White Reinforcing Fillers in Elastomers", by H. Westlinning and H. Fleischhauer (Degussa) p. 425, Interscience. (1965).

Voet et al. "Reinforcement of Elastomers by Fillers: Review of Period 1967–1976", J. Poly Sci. vol. 15, p. 327. (1980).

Voet et al. "Reinforcement of Elastomers by Silica, Rubber Chemistry & Technology", vol. 50, p. 342. (1977).

Polmanteer, et al. "Reinforcement–Effect of Silica Structure on Properties and Crosslink Density", Rubber Division, ACS $107^{th}$ Meeting, May 6–9, 1975.

M.T. Maxson, C.I. Lee, (Dow Corning), "Meeting Today's Needs With Liquid Silicone Rubber", "Rubber & Plastics News", p. 36, Oct. 7, 1985.

E.I. Warrick, O.R. Pierce, K.E. Polmanteer, J.C. Saam, (Dow Corning), "Silicone Elastomers Development", "Rubber Chemistry & Technology", vol. 52, pp. 437, 1979.

K.E. Polmanteer, (Dow Corning), "Current perspectives on silicone rubber technology", "Rubber Chemistry & Technology", vol. 54, pp. 1051, 1981.

K.E. Polmanteer, C.W. Lentz, (Dow Corning), "Reinforcement studies–effect of silica structure on properties and crosslink density", "Rubber Chemistry & Technology", vol. 48, p. 795, 1975.

B.B. Boonstra, H. Cochrane, E. Dannenberg, "Reinforcment of Silicone Rubber by Particulate Silica", "Rubber & Chemistry Technology", vol. 48, p. 558, 1975.

G.R. Cotton, Cabaot Corp., "Mixing of Carbon Black with Rubber I, II", Rubber Chemistry & Technology, vol. 57 (p. 118) and vol. 58 (p. 774). No Date.

G.R. Cotton. Cabot Corp., "Influence of Carbon Black in Processability of Rubber Stocks, I, II, III", Rubber Chemistry & Technology', vol. 48, p. 548, 1975; vol. 51, p. 749, 1978; vol. 52, p. 187, 1979.

A.I. Medalia, Cabot Corp., "Filler Aggregates and Their Effect on Reinforcement", "Rubber Chemistry & Technology" vol. 47, p. 411, 1974.

A.I. Medalia, Cabot Corp., "Effect of Carbon Black on Dynamic Properties of Rubber Vulcanizates", "Rubber Chemistry & Technology", vol. 51, p. 437, 1978.

A.I. Medalia, S.G. Laube, Cabot Corp., "Influence of Carbon Black on Dynamic Properties and Morphology on Hysteresis of Rubber Vulcanizates", "Rubber Chemistry & Technology", vol. 51, p. 89, 1978.

E.M. Dannenberg, Cabot Corp., "The Effects of Surface Chemical Interactions on The Properties of the Filler Reinforced Rubbers", "Rubber Chemistry & Technology", vol. 48, p. 410, 1975.

D.W. Southwart, T. Hunt, "The Silicone Rubber/Silica System", J. Institutes of the Rubber Technology, Part 1–1968, 2,77, Part 2–1968, 2,79, Part 3–1968, 2,140, Part 4–1969, p. 249, Part 5–1969, p. 74, Part 6–1969, p. 77.

D.W. Southwart, Dunlop, "Structural Implications of the /Silicone Rubber/Silica System", ACS 1971 meeting in Cleveland. Paper 70.

D.W. Southwart, Dunlop, "Network Structure of the Silicone Rubber/Silica System", International Rubber Conference, Brighton, May 1972.

D.W. Southwart, Dunlop, "Silica Reinforcement of Rubbers". Date and journal unknown. No Date.

M.T. Maxson, C.I. Lee, (Dow Corning), "Effects of Fumed Silica Treated with Functional Disilazanes on Silicone Elastomers Properties", "Rubber Chemistry & Technology", vol. 55, p. 233, 1982.

Harry L. Chapman, Michael A. Lutz and Keith E. Polmanteer (Dow Corning), "Novel Wet–Process Silica Prepared From Alkyl Silicates", Part II: Performance in Reinforcing Silicone Elastomers. Part III: "Use in Silicone Elastomers for Optical Applications", "Rubber Chemistry & Technology", vol. 58, p. 939, 1985; vol. 58, p. 953, 1985; vol. 58, p. 965, 1985.

K.E. Polmanteer, J.D. Helmer, (Dow Corning), "Complexities of Crosslink Density in Filled Elastomers", "Rubber Chemistry & Technology", vol. 38, No. 1, Mar. 1965.

David R. Salverson, (Dow Corning), "Silicone Materials for Thermal Management", presented at the Rubber Division, ACS, Apr. 19–22, 1988.

* cited by examiner

SILICON-TREATED CARBON BLACKS SURFACE TREATED WITH A SILICONE FLUID OR A SILANE

This application is a continuation of U.S. Pat. Application No. 08/529,234 filed Sep. 15, 1995, now U.S. Pat. No. 6,020,402.

BACKGROUND OF THE INVENTION

1. Field of the Invention

The present invention is directed to silicone rubber compositions and, more particularly, to silicone rubber compositions incorporating silicon-treated carbon blacks and processes for making the same.

2. Description of the Related Art

Silicone rubber compositions are used in a wide variety of applications due to their superior and unique properties relative to other organic elastomers over a wide temperature range. For example, silicone rubber compositions provide superior heat resistance compared to other elastomers. Moreover, silicone rubbers have low electrical conductivity and, therefore, excellent insulating properties, particularly under wet conditions. In addition, silicone rubbers have good chemical, fuel, and oil resistance, and are weatherable and resistant to ozone attack. It is believed that these properties of silicone rubber compositions are due to the unusual molecular structure of the polymer, which typically consists of dimethyl siloxane units.

A typical silicone rubber composition contains a silicone polymer, reinforcing and extending fillers, processing aids or softeners to plasticize and retard crepe hardening, additives, colorants, and one or more curing agents. The silicone rubber composition may be compounded by methods known to those skilled in the art utilizing conventional process equipment, such as extruders, Dough mixers, Banbury mixers and two-roll mills.

Notwithstanding the above-noted properties, pure silicone rubber polymers, or polydimethyl siloxanes (also called "gums"), are weak elastomers. As a result, although silicone polymers may be used alone, rubber fabricators often compound silicone rubber elastomers from silicone gums or bases that contain reinforcing and/or extending fillers. In addition, these fillers are added to silicone rubber to increase their hardness and reduce their stickiness.

Various fine particle silicas are commonly used as rheology control agents to provide easy application and retention of an extruded shape during curing. Fumed silica also is the most commonly used reinforcing filler, providing superior reinforcement, and increased hardness, tensile, and elongation in silicone rubber elastomers. Typically, the reinforcing silica is incorporated into the silicone polymer prior to vulcanization. The high purity of fumed silica provides the silicone rubber composition with excellent physical and insulating properties. Depending on the desired properties and the end use application, between about 5.0 and about 40.0 percent, by weight, fumed silica is typically used in silicone rubber compositions.

In addition to fumed silica, precipitated silicas may be used as reinforcing fillers to provide silicone rubber compositions with moderately high reinforcement and improved physical properties such as tensile strength and elongation. In addition to fumed and precipitated silicas, other materials are used as semi-reinforcing or extending fillers, as well as processing aids, additives, and colorants, to obtain an optimum balance of physical properties, costs, and processability. For example, zinc oxide is used as a colorant and as a plasticizer, imparting heat conductivity, tack and adhesive properties to a rubber composition. Similarly, red iron oxide can be used as colorant and as a stabilizer against heat aging. Carbon black provides silicone rubber compositions with electrical conductivity, and is an additive and colorant that is known to provide moderate reinforcement.

Processing aids are often add to highly reinforcing silica fillers to provide a softening or plasticizing effect. In addition, the shelf life of the compounded rubber is increased by slowing the crepe-hardening effect in the silicone rubber that occurs as a result of bonding of the polymer and the reinforcing filler.

Finally, typical silicone rubber compositions include one or more curing agents including peroxides. Among the variety of peroxide curing agents, not one can be used for all types of silicone polymers. For example, aroyl peroxides may be considered general-purpose curing agents in that they will cure both non-vinyl and vinyl-containing silicone polymers. However, these agents are not suitable in all fabrication procedures. In addition, vinyl-specific peroxides such as dicumyl peroxide, and others, may also be used to vulcanize silicone rubber.

As noted above, in addition to being used as an additive and colorant, carbon black may also be used to provide moderate reinforcement in silicone rubber compositions. However, carbon black is known to inhibit cure with non-vinyl and vinyl-containing silicone polymers, in addition to reducing the thermal stability of silicone rubber compositions. These disadvantages tend to limit the use of carbon black to applications requiring electrically conductive or semi-conductive rubbers and/or as a colorant.

In applications where the high to moderately-high reinforcement provided by fumed and precipitated silicas is not required in silicone rubber applications, a need remains for alternative fillers and additives that provide the desired level of reinforcement and physical properties, such as hardness, tensile strength and elongation. In addition, alternative fillers and additives are desired to reduce compounding costs and enhance processability of silicone rubber compositions.

SUMMARY OF THE INVENTION

Accordingly, the present invention is directed to silicone rubber compositions including a silicone polymer and a silicon-treated carbon black. The silicon-treated carbon blacks include a silicon-containing region that is either primarily distributed through at least a portion of the carbon black aggregate, or at the surface of the carbon black aggregate. The silicon-treated carbon black contains between about 0.1 and about 25.0 percent silicon, by weight.

In a silicone rubber composition, including a silicone polymer and a silicon-treated carbon black, the silicon-treated carbon black that is used as an alternative reinforcing filler, or as an additive, imparts higher hardness to silicone elastomers formed from the composition, when compared to silicone rubber compositions containing an untreated carbon black.

Other objects and features of the present invention will become apparent from the following detailed description.

DETAILED DESCRIPTION OF THE INVENTION

The present invention is directed to silicone rubber compositions, including a silicone polymer and a silicon-treated carbon black, which result in silicone elastomers having desirable physical properties. The silicon-treated carbon blacks include a silicon-containing species, including but not limited to, oxides and carbides of silicon, that is distributed through at least a portion of the carbon black aggregate as an intrinsic part of the carbon black. The silicon-treated carbon black may be incorporated within a silicone rubber composition as an alternative reinforcing and extending filler or as an additive.

In a silicone rubber composition, including a silicone polymer and a silicon-treated carbon black, the silicon-treated carbon black imparts higher hardness (Shore A) to silicone elastomers formed from the composition, when compared to silicone rubber compositions containing an untreated carbon black.

As is generally known to those skilled in the art, carbon blacks are produced in a furnace-type reactor by pyrolyzing a hydrocarbon feedstock with hot combustion gases. The carbon black produced exists in the form of aggregates of carbon black particles. Similarly, silica exists in the form of aggregates, which are formed of silica particles that do not generally exist independently of the silica aggregate. The silicon-treated carbon black aggregates do not represent a mixture or blend of discrete carbon black and silica aggregates. Rather, the silicon-treated carbon blacks include at least one silicon-containing region, either at the surface or within the carbon black aggregate.

The silicon-treated carbon blacks may be produced by manufacturing the carbon black in the presence of silicon-containing compounds. Typically, carbon blacks are produced in a staged furnace reactor, including a combustion zone, a converging diameter zone, a restricted diameter feedstock injection zone, and a reaction zone. Hot combustion gases are generated in the combustion zone by contacting a liquid or gaseous fuel with a suitable oxidant stream, such as air, oxygen, or mixtures thereof. The oxidant stream may be preheated to facilitate the generation of hot combustion gases. Any readily combustible gas, vapor or liquid stream, including natural gas, hydrogen, methane, acetylene, alcohols, or kerosene may be used to contact the oxidant in the combustion zone to generate hot combustion gases. Preferably, fuels having high carbon content, such as hydrocarbons, petroleum refinery oils from catalytic cracking operations, as well as coking and olefin manufacturing operation by-products are burned in the combustion zone. The ratio of oxidant to fuel varies with the type of fuel utilized. For example, when natural gas is used the ratio may vary between about 10:1 to about 1000:1.

Once generated, the hot combustion gas stream is directed into the reaction zone. The carbon black feedstock stream is introduced into the reactor in the injection zone. Typically, the feedstock is injected into the hot combustion gas stream through nozzles designed for optimum distribution of the fuel. A single- or bi-fluid nozzle may be used to atomize the fuel. The carbon black is then produced by pyrolysis, or partial combustion, in the reaction zone as the feedstock and the hot combustion gases are mixed. A cooling fluid, such as water, is then sprayed into the gas stream, containing the formed carbon black particles, in a quench zone that is positioned downstream of the reaction zone. The quench is used to decrease the reaction rate and cool the carbon black particles. The quench stream is positioned a predetermined distance from the reaction zone; alternatively, a plurality of quench streams may be positioned throughout the reactor. After the carbon black is sufficiently cooled the product is separated and recovered by conventional methods.

The silicon-treated carbon blacks are produced by introducing a volatilizable silicon-containing compound into the carbon black reactor at a point upstream of the quench zone. Preferably, the silicon-containing compound is volatilizable at carbon black reactor temperatures. Such compounds include, for example, alkoxy silicates, including tetraethoxy orthosilicate (TEOS) and tetramethoxy orthosilicate, silanes, including tetrachloro silane and trichloro methylsilane, and mixtures thereof, and volatile silicone polymers, including octamethyl-cyclotetrasiloxane (OMTS). It has been found that the silicon concentration on the carbon black is determined by the flow rate of the silicon-containing compound into the reactor. The silicon concentration on the carbon black may be as high as commercially feasible to obtain a reinforcing filler that optimizes physical properties, cost, and processability of a silicone rubber composition. Typically, there is between about 0.1 and about 25.0 percent silicon, by weight, on the carbon black; preferably, about 0.5 and about 25.0 percent silicon, by weight; and most preferably, there is between about 6.0 and about 25.0 percent silicon, by weight, on the carbon black.

The silicon-containing compound may be thoroughly premixed with the carbon black feedstock and introduced into the reactor through the feedstock injection zone. Alternatively, the silicon-containing compound may be introduced into the reactor separately, either upstream or downstream from the feedstock injection zone. The silicon-containing compound, however, must be introduced upstream from the quench zone. Upon volatilization, and exposure to the high reactor temperatures, the silicon-containing compound decomposes within the reaction zone and forms the silicon-treated carbon black, such that silica (or other silicon-containing species) becomes an inherent part of the carbon black.

It has been found that introducing the silicon-containing compound substantially simultaneously with the carbon black feedstock results in silicon-treated regions distributed throughout at least a portion of the carbon black aggregate. Alternatively, introducing the silicon-containing compound into the reaction zone after the formation of the carbon black, and prior to the quench, results in silicon-treated regions at or near the surface of the carbon black aggregate. The production of silicon-treated carbon blacks is also disclosed in co-pending U.S. patent application Ser. No. 08/446,141, entitled ELASTOMERIC COMPOUNDS INCORPORATING SILICON-TREATED CARBON BLACKS, filed on May 22, 1995, which is incorporated herein by reference.

The silicon-treated carbon blacks may be utilized to reinforce any silicone rubber polymer. As is known to those skilled in the art, depending on the desired properties and end use application, a variety of silicone polymers can be produced, and certain chemical and physical properties can be enhanced, by replacing a portion of the methyl-containing groups in the polydimethyl siloxane chain with phenyl-containing groups, vinyl-containing groups, fluorine-containing groups, phenyl- and vinyl-containing groups, and mixtures thereof. For example, dimethyl silicone rubber tends to become stiff below −60° F. It has been found that the low temperature flexibility may be improved by substitution of only five percent of the methyl groups with phenyl groups in the polymer chain. This substitution lowers the crystallization temperature, allowing use of the silicone rubber to temperatures below −130° F. It has also been found that less than 0.5 percent of a vinyl-containing group, such as methylvinyldichloro silane, results in a low compression set silicone polymer that requires less peroxide curing agent to cure. Finally, it has been found that the replacement of one methyl group on each silicon atom in the polymer chain with a polar group, such as trifluoropropyl, reduces swelling in aliphatic and aromatic hydrocarbons.

As noted, silicone rubber compositions typically include reinforcing and/or extending fillers, processing aids or softeners to plasticize and retard crepe hardening, additives, colorants, and one or more peroxide curing agents in addition to the silicone polymer. As noted above, although fumed silica is the preferred reinforcing filler used in silicone rubber compositions, the silicon-treated carbon black of the present invention may be used as an alternative reinforcing filler and/or additive to obtain an optimum balance of physical properties, costs, and processability.

In addition to the reinforcing fillers and additives, a variety of curing agents can be used in silicone rubber compositions. Generally, silicone rubber compositions are heat-cured in the presence of an organic peroxide, such as bis(2,4-dichlorobenzoyl) peroxide, di-benzoyl peroxide, tertiary butyl perbenzoate, dicumyl peroxide, 2,5-dimethyl-2, 5-bis(t-butyl peroxy)hexane, and di-tertiary butyl peroxide. As known to those skilled in the art, none of the peroxides is a universal curing agent. The aroyl peroxides may be considered general purpose curing agents in that they will cure non-vinyl and vinyl-containing polymers, but no one of them can be used in all fabrication procedures. These general purpose peroxide curing agents are used at cure temperatures of between about 220° F. (about 105° C.) to about 310° F. (about 155° C.) in a variety of fabrication procedures. The dialkyl peroxides are considered vinyl-specific peroxide curing agents because they provide good curing only with vinyl-containing silicone polymers. These curing agents are used to cure silicone rubbers at temperatures between about 300° F. (about 150° C.) and about 360° F. (about 185° C.), and are generally used in thick-section molding, low compression set compositions, and they may be employed to vulcanize compositions containing carbon black.

The surface of the silicon-treated carbon blacks may be further treated with a silicone fluid and/or a silane prior to incorporation into a silicone rubber composition to reduce any filler-filler association, and/or any filler-polymer bonding, within the silicone compositions. Therefore, at a given filler loading level, the silicone rubber elastomer reinforced with a treated silica, and/or a treated silicon-treated carbon black, will have lower hardness and modulus. Such treating agents include, for example, polydimethyl siloxane oils of various molecular weights, dimethyldichloro silane, and disilazanes, such as hexamethyl disilazane (HMDZ), and mixtures thereof, which are known treating agents for fumed silica. Typically, the surface treatment of the reinforcing filler makes them hydrophobic, and reduces the crepe-hardening effect within the silicone rubber composition. Any such surface treating agent may be compounded with a silica or the silicon-treated carbon black by methods known to those skilled in the art. Silicone rubber compositions incorporating surface treated fumed silica and/ or silicon-treated carbon black have been found to be more extrudable than compositions incorporating untreated fillers. In addition, the surface treated fillers provide silicone rubber compositions with a shelf-stable base, as well as permitting a much higher filler loading level, thereby providing improved reinforcement to the silicone rubber composition.

The silicon-treated carbon blacks may be used in the four major product categories of silicone rubber compositions: one- and two-component room temperature vulcanizates (RTV-1, and RTV-2), heat cured rubber (HCR), and liquid solution rubber (LSR). Generally, product compositions in each category comprise a silicone polymer, a reinforcing filler, and a curing (cross-linking) agent. RTV's are used as a wide variety of products including, for example, adhesives, sealants and potting compounds, gaskets, encapulants, caulking, and molds. The RTV-1 products are one-component systems, including a silicone polymer, a filler, an initiator, and an oxime catalyst, which can cure at room temperature and humidity. The RTV-2 products are two-component systems, including a high viscosity silicone polymer, a low viscosity silicone oil, and a filler, which can be cured at room temperature and humidity over a predetermined period of time.

HCR's exhibit consistent physical properties over a broad temperature range of about −80° C. to about 250° C., including good dielectric properties and physiological inertness. HCR's are used as a wide variety of products including, for example, tubing and hoses, belting, wire-cable insulation, surgical aids and medical implants, fuel-resistant rubber parts, penetration seals, rollers, electrically conducting rubber, fabric coating, and foams. HCR's typically contain about 100 parts of a silicone copolymer, about 40 parts per-hundred (phr) of fumed silica, about 2 phr of a peroxide curing agent, and other additives. The silicone composition is then processed by, for example, compression or transfer molding, extrusion, calendering, and the like, to form a silicone rubber product. The HCR products are typically cured by crosslinking at temperatures of up to about 170° C., and by postcuring at temperatures up to about 250° C.

LSR's are two-part, pumpable fluids that can be processed using low pressure automatic injection molding equipment. These materials cure upon mixing and heating, and provide silicone rubber products that release easily from molds, and require little or no post-curing. These products have been found to be resistant to non-polar solvents. Typically, LSR's are based on pumpable polydimethylsiloxane comprising a small percentage of vinyl groups to enhance curing.

The present invention will be further illustrated by the following examples, which are intended to be illustrative in nature and are not to be considered as limiting the scope of the invention.

EXAMPLE I

Silicon-treated carbon blacks, incorporated into silicone rubber compositions of the present invention, were prepared using a carbon black furnace reactor. The reactor included an XB-15 burner having a 2 inch transition and a single 0.030 inch oil tip. The reaction zone was 60 inches in length and had an ID of 6 inches. The reactor included injection ports positioned at 9 inches, 30 inches and 45 inches after the reactor's transition portion. The water-cooled quench zone included a single port having a #5 nozzle positioned 30 inches from the feedstock injection. The quench temperature was 1150° F. A summary of the production conditions are set forth in Table I below.

The production conditions were altered by adding a volatilizable silicon-containing compound into the reactor to obtain a silicon-treated carbon black. The flow rate of the volatilizable compound was adjusted to alter the weight percent of the silicon on the carbon black. The weight percent of silicon on the treated carbon black was determined by an ashing test, conducted according to ASTM procedure D-1506. Two samples of silicon-treated carbon black were prepared by introducing a silicon-containing volatilizable compound, tetraethoxy silane (TEOS), available from Huls America, Piscataway, N.J., into the hydrocarbon feedstock. For Samples 1 and 2, the TEOS was added through (1) the carbon black feedstock (FS) injection, and (2) the port positioned 9 inches after the transition into the reactor. Samples 3–5 of a silicon-treated carbon black were then prepared by injecting an organo-silicon compound, octamethyl-cyclotetrasiloxane (OMTS), available as "D-4" from Dow Corning Corporation, Midland, Mich., into the hydrocarbon feedstock. The D-4 was added (1) with the carbon black feedstock (FS) injections at two feed rates (resulting in 8% and 12% silicon on the carbon black), and (2) through the port positioned 9 inches after the transition into the reactor. A sixth, Baseline, sample included only carbon black made directly from feedstock, and resulted in a carbon black identified by the ASTM designation N234 (commercially available as Vulcan® 7H carbon black, available from Cabot Corporation, Boston, Mass.).

TABLE I

| SAMPLE | Feedstock[1] Rate (lbs./hr.) | Si Additive Rate (lbs./hr.) | Air Rate[2] (kscfh) | Nominal Gas Rate (kscfh) |
|---|---|---|---|---|
| 1. 8% TEOS@FS | 97.4 | 21.6 | 13.82 | 1.5 |
| 2. 8% TEOS@9" | 116.3 | 34.9 | 13.82 | 1.5 |
| 3. 8% D-4@FS | 107.9 | 8.43 | 13.82 | 1.5 |
| 4. 12% D-4@FS | 106.1 | 14.42 | 13.82 | 1.5 |
| 5. 8% D-4@9" | 107.9 | 8.42 | 13.82 | 1.5 |
| 6. Baseline | 116.3 | 0 | 13.82 | 1.5 |

[1].The feedstock used in all Samples is methylnaphthalene, fed at about 50° F.
[2].Air was preheated to about 800° F.

The resulting silicon-treated carbon blacks were analyzed for silicon content, surface area and silicon conversion efficiency. In addition, the pH and hydroxyl content were evaluated. These values were then compared to those of Cab-O-Sil® M-7D and MS-75D untreated fumed silicas (Cabot Corporation). In addition, the BET surface areas and the loss on drying (LOD), were measured for each sample. The BET surface area is measured by the adsorption of nitrogen. For the fumed silica, Carman surface areas (CSA) were measured. The CSA is an indirect method to measure structure, and is determined by air flow at very low pressures over a silica plug. The external surface area (t-Area) was measured for silicon-treated carbon blacks, following the sample preparation and measurement procedure described in ASTM D3037—Method A for Nitrogen surface area. The analytical results for pelleted samples dried in an electric oven are presented in Table II.

TABLE II

| SAMPLE | wt % Silicon in Carbon Black | t-Area ($m^2/g$) | $N_2$-Area ($m^2/g$) | Si Conv. Efficiency (%) |
|---|---|---|---|---|
| 1. 8% TEOS@FS | 15.9 | 248.1 | 434.5 | 88.7 |
| 2. 8% TEOS@9" | 17.6 | 193.7 | 276.7 | 91.0 |
| 3. 8% D-4@FS | 18.9 | 259.1 | 496.9 | 107.8 |
| 4. 12% D-4@FS | 23.3 | 260.0 | 514.5 | 87.4 |
| 5. 8% D-4@9" | 13.4 | 221.0 | 347.2 | 87.3 |
| 6. Baseline | 0.18 | 246.3 | 400.5 | 0.00 |

| SAMPLE | pH | BET SA ($m^2/g$) | C SA ($m^2/g$) | LOD | OH |
|---|---|---|---|---|---|
| 1. 8% TEOS@FS | 6.58 | 408 | | 0.34 | 1.39 |
| 2. 8% TEOS@9" | 6.81 | 265 | | 0.30 | 1.84 |
| 3. 8% D-4@FS | 6.76 | 459 | | 0.26 | 1.13 |
| 4. 12% D-4@FS | 7.06 | 486 | | 0.37 | 1.81 |
| 5. 8% D-4@9" | 7.41 | 327 | | 0.27 | 1.00 |
| 6. Baseline | 7.65 | 380 | | 0.27 | 0.68 |

TABLE II-continued

| 7. M-7D | 4.12 | 194 | 109 | 0.75 | 2.95 |
| 8. MS-75D | 4.04 | 252 | 132 | 1.90 | 3.44 |

As noted, the pH of each of the silicon-treated carbon blacks is higher than that of the fumed silicas. The hydroxyl content of the reinforcing filler is an important value in determining the interaction of each with silicone polymers. The isolated hydroxyl groups on the surface of the filler bond with the polymers. The surface area values are indicative of the degree of branching and symmetry of the aggregate.

EXAMPLE II

The silicon-treated carbon blacks prepared in EXAMPLE I were incorporated into HCR silicone rubber compositions utilizing silicone polymers having (I) no vinyl-containing groups, (II) high vinyl, and (III) low vinyl. Compositions were prepared and evaluated for Shore A hardness, tensile strength (psi), and elongation (%).

The evaluated silicone rubber compositions were prepared using a polydimethylvinyl siloxane polymer. The no-vinyl containing polymer used was Dow Corning Q4-2735 (ASTM designation VMQ), the low-vinyl containing polymer used was Dow Corning Q4-2901, and the high-vinyl containing silicone polymer used was Dow Corning DC410, all available from Dow Corning Corporation, Midland, Mich. A processing aid, a hydroxyl-terminated low molecular weight polydimethyl siloxane fluid was incorporated into the evaluated silicone rubber compositions. The processing aid used was Dow Corning, Q4-2737 (ASTM designation MQ). The peroxide catalyst used in the no-vinyl polymer composition was a 50% dispersion of bis(2,4-dichlorobenzoyl) peroxide in silicone fluid, available as Cadox® TS-50 organic peroxide, available from Akzo Chemical, Chicago, Ill. The peroxide catalyst used for the vinyl containing silicone polymer compositions was a 50% dispersion of dicumyl peroxide in silicone fluid, available as DICUP® R organic peroxide, and DICUP® 40C organic peroxide, available from Hercules, Inc. Wilmington, Del. The standard formulation for each group included 100 parts of the silicone polymer, 2 parts peroxide paste, and a variable amount of the processing aid (depending upon the surface area of the silica and its loading level).

The compounding of the silicone rubber compositions was performed in a Haake Rheomix® 410 mixer. The polymer gum was added to the mixer, and mixed at about 50 rpm for about 10 minutes. When used, the silica reinforcing filler was added with the processing aid. The composition was allowed to mix for about one hour. Heating was then applied for approximately one hour at about 110° C. The peroxide catalyst was then added on a two-roll mill prior to curing the samples. The physical properties of the cured rubber were measured using standard ASTM test procedures. The tensile slabs were cured for five minutes at about 116° C. and an additional four hour oven post cure at about 200° C. The results are reported below in Table III.

The silicone rubber composition utilizing the Dow Corning Q4-2735 silicone polymer was first cured by itself. A second sample was then cured utilizing 40 phr of Cab-O-Sil® M-7D untreated fumed silica, which is typical of silica reinforcing agents used by silicone rubber compounders, available from Cabot Corporation, Cab-O-Sil Division, Tuscola, Ill. Three other samples were then cured utilizing mixtures of the M-7D fumed silica and CanCarb® MT-N990 carbon black, available from Witco Corporation, Houston, Tex. These mixtures included 35/5 phr, 30/10 phr, and 25/15 phr silica/carbon black, respectively.

A second group of silicone rubber compositions, including the Dow Corning DC410 high vinyl silicone polymer, were cured using 40 phr of the baseline carbon black (produced in Example I), 40 phr M-7D untreated fumed silica, and 40 phr of the silicon-treated carbon black (Sample 4, Example I). Lastly, silicone rubber compositions, including Dow Corning Q4-2901 low vinyl silicone polymer, were evaluated. These polymers were reinforced utilizing 30 phr of the silicon-treated carbon blacks, and the baseline carbon black, (produced in Example I), as well as with 30 phr M-7D fumed silica.

TABLE III

|  | Hardness (Shore A) | Tensile (psi) | Elongation (%) |
|---|---|---|---|
| I. No vinyl gum: |  |  |  |
| Cured by itself | 16 | 28 | 52 |
| 40 phr, M-7D | 57 | 1162 | 253 |
| 35/5 phr, M-7D, CanCarb | 42 | 1200 | 453 |
| 30/10 phr, M-7D, CanCarb | 20 | 887 | 837 |
| 25/15 phr, M-7D, CanCarb | Did not cure |  |  |
| II. High vinyl gum: |  |  |  |
| 40 phr, Baseline | 41 | 522 | 435 |
| 40 phr, M-7D | Cured but too brittle |  |  |
| 40 phr, 12% D4@FS | Did not cure |  |  |
| III. Low vinyl gum: |  |  |  |
| 30 phr, 8% TEOS@9" | 47 | 141 | 145 |
| 30 phr, 8% D4@FS | 35 | 104 | 513 |
| 30 phr, 8% D4@9" | 35 | 212 | 460 |
| 30 phr, 8% TEOS@FS | 43 | 67 | 45 |
| 30 phr, 12% D4@FS | 34 | 54 | 70 |
| 30 phr, Baseline | 19 | 394 | 886 |
| 30 phr, M-7D | 46 | 927 | 379 |

The results indicate that the silicone polymer having no vinyl groups had the lowest hardness value when cured by itself, while the highest hardness value resulted when 40 phr of a fumed silica was added.

In the no-vinyl silicone polymer compositions the hardness deteriorated as the level of silica decreased. At silica levels of 25 phr the composition did not cure. The high vinyl silicone polymer compositions cured using 40 phr of the Baseline carbon black. The high vinyl system also cured using 40 phr of the M-70 fumed silica but was too brittle, while the composition using 40 phr of the silicon-treated carbon black (Example I, Sample 4) did not cure.

The silicon-treated carbon blacks, added at 30 phr, provided the low-vinyl silicone polymer compositions with higher hardness, compared to the Baseline untreated carbon black. The 30 phr, 8% TEOS@9" sample performed similarly to the 30 phr M-7D fumed silica with respect to the hardness property.

It is believed that the silicon-containing species in the silicon-treated carbon blacks consists essentially of silica. It is this form of silicon-containing species that the interaction with the siloxane groups of the silicone polymer exists, thereby providing a unique reinforcement in silicone rubber systems.

EXAMPLE III

The silicon-treated carbon blacks prepared in EXAMPLE I were incorporated into silicone rubber compositions in addition to fumed silica reinforcing fillers. Cab-O-Sil® M-7D untreated fumed silica (Cabot Corporation) was used as the reinforcing filler in equal amounts with each of the silicon-treated carbon blacks prepared in EXAMPLE I, as well as the baseline carbon black. In addition, the effectiveness of the mixed silicon-treated carbon black/fumed silica filler was compared to systems incorporating 40 phr M-7D fumed silica reinforcing filler. Silicone rubber compositions, utilizing the low vinyl polymer composition of Example II were compounded using each of the fillers. The resulting products were cured and evaluated for Shore A hardness, tensile strength (psi), and elongation (%). The results are reported below in Table IV.

TABLE IV

| SAMPLE | Hardness (Shore A) | Tensile (psi) | Elongation (%) |
|---|---|---|---|
| 20/20 phr M-7D, Baseline | 36 | 837 | 471 |
| 20/20 phr M-7D, 12% D4@FS | 54 | 297 | 229 |
| 20/20 phr M-7D, 8% TEOS@9" | 57 | 443 | 221 |
| 20/20 phr M-7D, 8% D4@9" | 56 | 829 | 314 |
| 20/20 phr M-7D, 8% TEOS@FS | 54 | 325 | 236 |
| 20/20 phr M-7D, 8% D4@FS | 46 | 365 | 261 |
| 40 phr HMDZ trt, 8% TEOS@9" | 47 | 207 | 329 |
| 40 phr M-7D | 55 | 1288 | 522 |
| 30 phr M-7D | 46 | 927 | 379 |

As expected, the composition with 40 phr fumed silica had the best overall combination of physical properties, including hardness, tensile strength, and elongation. The composition using a mixture of the baseline carbon black and fumed silica had the lowest hardness values. The silica-doped carbon black containing systems performed well with respect to the hardness. Of these, the samples utilizing TEOS gave higher hardness values than those using the D-4 material.

EXAMPLE IV

A silicon-treated carbon black (8%TEOS@9"), prepared in EXAMPLE I (Sample 2), was treated with hexamethyl disilazane (HMDZ) prior to being incorporated into a silicone rubber composition. The HMDZ treated silicon-treated carbon black was produced by mixing 200 grams of the silicon-treated carbon black with 8 grams deionized water in a three liter plastic bag. The mixture was allowed to stand overnight. About 40 grams of HMDZ was then added to the mixture, which was allowed to stand overnight. The treated material was placed in a vented oven, at a temperature of about 125° C. for approximately 16 hours. The treated product produced was hydrophobic. About 40 phr of the HMDZ treated silicon-treated carbon black, and 40 phr M-7D untreated fumed silica, were incorporated into the low-vinyl silicone polymer of EXAMPLE II. The resultant compositions were evaluated for Shore A hardness, tensile strength, and elongation. The results are reported below in Table V.

TABLE V

| SAMPLE | Hardness (Shore A) | Tensile (psi) | Elongation (%) |
|---|---|---|---|
| 40 phr HMDZ trt 8% TEOS@9" | 47 | 207 | 329 |
| 40 phr M-7D | 55 | 1288 | 522 |

The HMDZ treated silicon-treated carbon black performed well with respect to hardness in the low-vinyl silicone polymer system. As expected, the composition with the fumed silica had the highest hardness, tensile strength and elongation.

Although particular embodiments of the invention have been described in detail for purposes of illustration, various modifications may be made without departing from the spirit and scope of the invention. Accordingly, the invention is not to be limited except as by the appended claims.

What is claimed is:

1. An aggregate comprising a carbon phase and a silicon-containing species phase, wherein said aggregate is surface treated with a silane, silicone fluid, or both.

2. The aggregate of claim 1, wherein said silane is a polydimethyl siloxane oil, dimethyldichloro silane, disilazane, or mixtures thereof.

3. The aggregate of claim 1, wherein said silicone is hexamethyl disilazane.

4. The aggregate of claim 1, wherein said aggregate is surface treated with a silane.

5. The aggregate of claim 1, wherein said aggregate is surface treated with a silicone fluid.

6. The aggregate of claim 1 wherein said aggregate contains between about 0.1 and about 25.0 percent silicon, by weight.

7. The aggregate of claim 6, wherein said aggregate contains between about 0.5 and about 25.0 percent silicon, by weight.

8. The aggregate of claim 7, wherein said aggregate contains between about 6.0 and about 25.0 percent silicon, by weight.

9. The aggregate of claim 1, wherein said aggregate includes silicon-containing regions primarily at the surface of the aggregate.

10. The aggregate of claim 1, wherein said aggregate includes silicon-containing regions distributed throughout the aggregate.

* * * * *